United States Patent [19]

Jespersen et al.

[11] 4,036,406
[45] July 19, 1977

[54] DISPENSER FOR LIQUIDS

[75] Inventors: Paul W. Jespersen; Raymond F. DeLuca, both of Stamford, Conn.

[73] Assignee: Georgia-Pacific Corporation, Portland, Oreg.

[21] Appl. No.: 674,928

[22] Filed: Apr. 8, 1976

Related U.S. Application Data

[63] Continuation of Ser. No. 476,000, June 3, 1974, abandoned.

[51] Int. Cl.² ............................................. G01F 11/06
[52] U.S. Cl. .................................. 222/181; 137/853; 222/309; 222/494
[58] Field of Search .............. 222/181, 309, 491, 494; 137/516.25, 843, 844, 852, 853, 860

[56] References Cited

U.S. PATENT DOCUMENTS

| | | | |
|---|---|---|---|
| 1,865,233 | 6/1932 | Campbell | 137/525 X |
| 1,886,288 | 11/1932 | McDow | 222/181 |
| 2,887,252 | 5/1959 | Nelsen | 222/181 |
| 2,898,009 | 8/1959 | Green | 222/309 X |
| 3,065,761 | 11/1962 | Peras | 137/525 X |
| 3,286,741 | 11/1966 | Gellman | 137/525 X |
| 3,348,744 | 10/1967 | Morin | 222/494 |
| 3,620,248 | 11/1971 | Cary | 137/516.25 X |

Primary Examiner—Stanley H. Tollberg
Assistant Examiner—Francis J. Bartuska

[57] ABSTRACT

A dispenser for liquids, including a supporting chassis, a supply tank for the liquid, a pump and a nozzle for conveying the liquid to the user of the dispenser. The nozzle has a housing member with an internal passage extending therethrough and has an insert and associated compressively elastically deformable sleeve positioned within. The insert has a passage extending from an opening in one end to at least one side opening, and the sleeve is interposed between the housing member and the inert with the portion of the sleeve adjacent the housing member being related against radially outward deflection by the housing member. The portion of the sleeve adjacent the insert encases the portion of the insert having the side opening to normally seal the side opening and thus prevent the liquid from leaking out of the nozzle. When the pump is actuated, the liquid compressively elastically deforms the portion of the sleeve adjacent the insert so that the sleeve is forced away from the insert side opening, and the liquid flows into the insert passage through the insert end opening, through the insert passage, out of the insert passage through the insert side opening, past the sleeve and out of the housing member passage.

34 Claims, 15 Drawing Figures

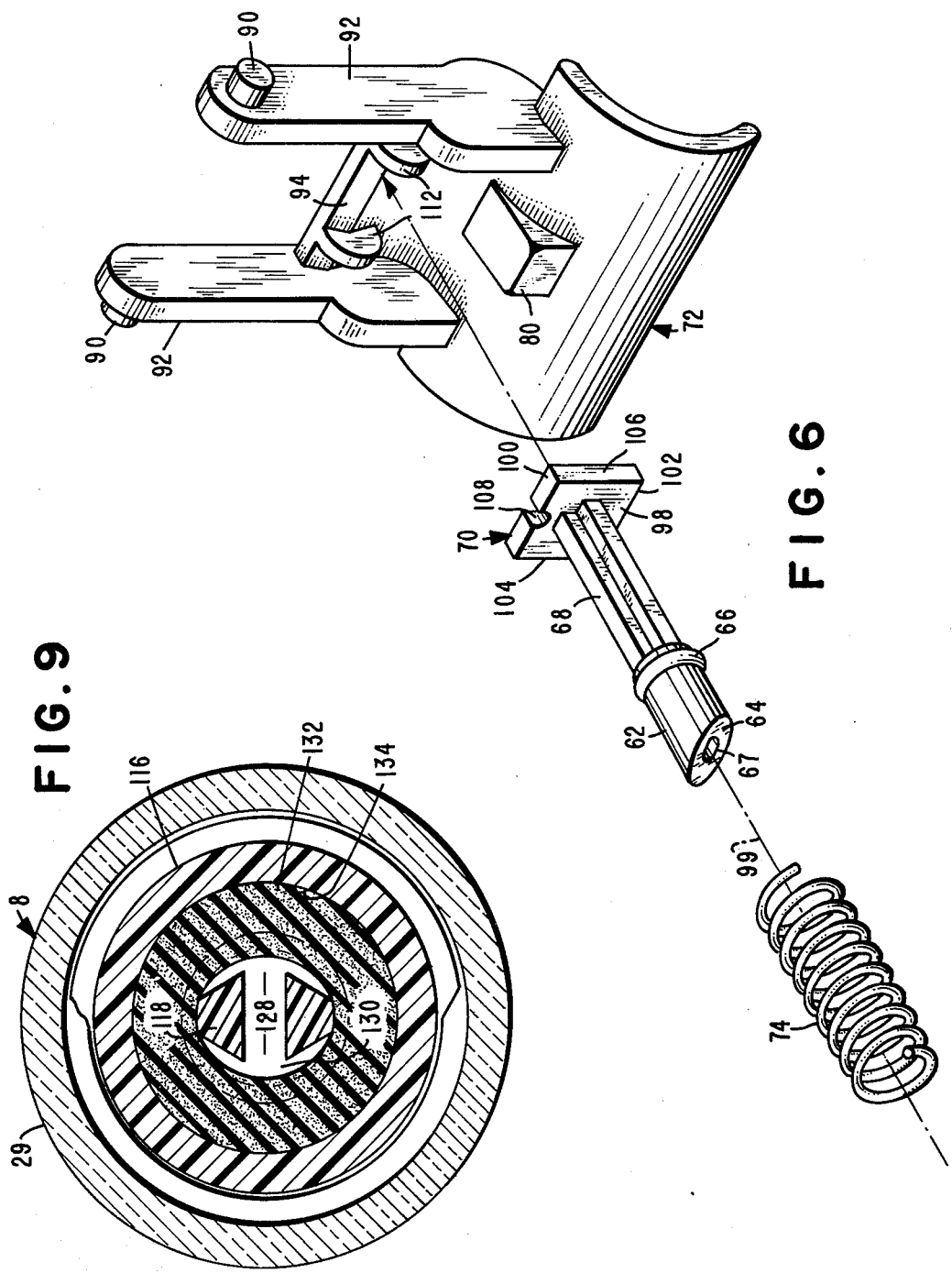

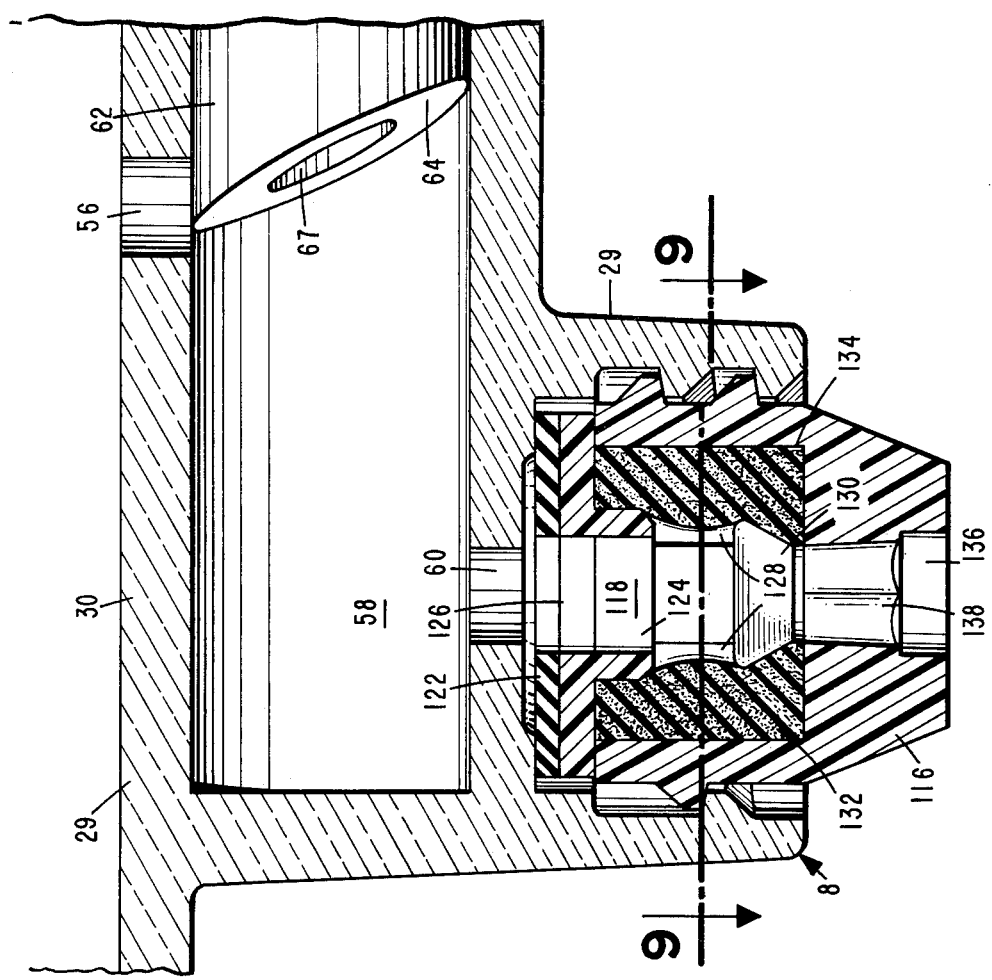
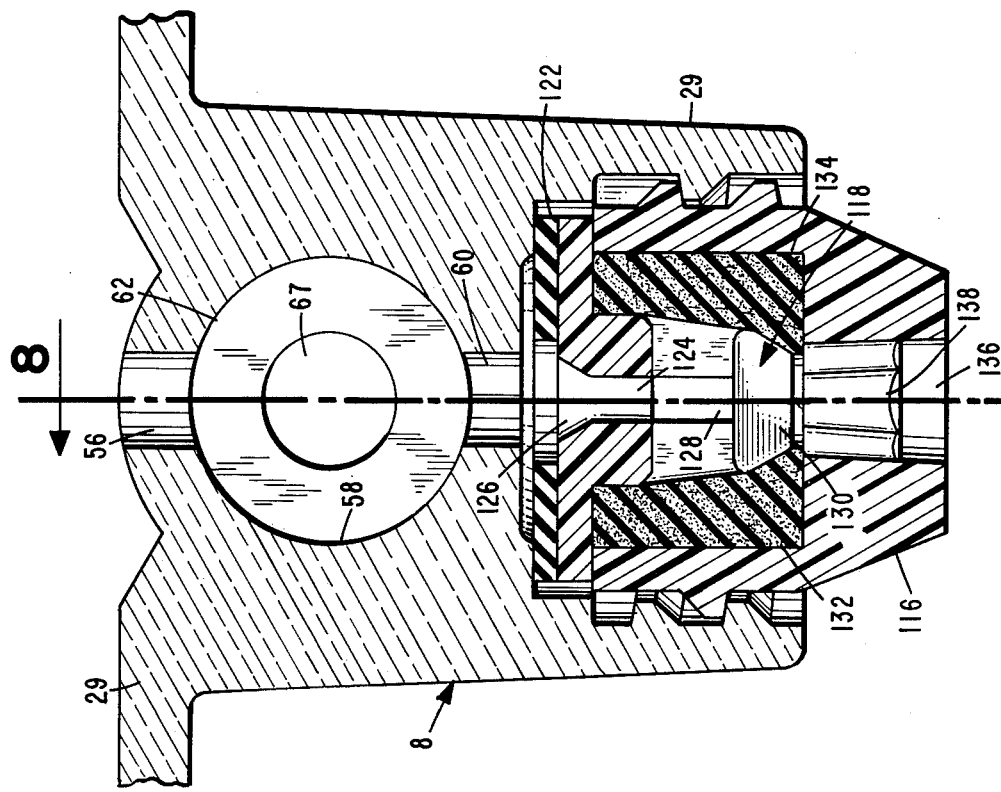

DISPENSER FOR LIQUIDS

This is a continuation, of application Ser. No. 476,000, filed June 3, 1974, now abandoned.

BACKGROUND OF THE INVENTION

This invention relates to apparatus for dispensing liquids and is especially suitable for use with relatively viscous liquids, such as liquid soap.

The prior art discloses numerous types of dispensers for liquids. These dispensers generally include a supporting structure, a supply tank, a pump communicating with such supply tank and some form of nozzle for conveying the discharge of the pump to the user. While many of these dispensers have functioned in a generally satisfactory manner, they frequently have exhibited one or more of several features disadvantageous to the purchasers and also the users thereof.

Disadvantages exhibited by such dispensers have included difficulties in filling the associated supply tanks and the tendency of the liquid material to drip from the nozzle at times when the dispenser is not being actuated, thus causing unattractive accumulations of the liquid beneath the dispenser. Many of these dispensers have also required the cooperative use of both hands of a user in their operation, a manner of operation that frequently may be inconvenient to a user. Additionally, such dispensers as are capable of one-hand operation frequently are so configured as to render difficult the dispensing of soap into the palm of the user's hand, the most desirable place of deposition. Such prior art dispensers have also lacked any convenient means of adjusting the volume of liquid which is dispensed by each actuation of the pump. Other problems associated with many such prior art dispensers have related to the failure to provide means for a reserve supply of the liquid such that the dispenser may be refilled on a regularly scheduled basis with little danger of exhausting the supply of liquid prior to such refilling.

SUMMARY OF THE INVENTION

This invention provides a dispenser for liquids which overcomes many of the problems of the prior art. The pump and the nozzle of this dispenser provide a convenient means of dispensing selectively predermined amounts of such liquid while substantially eliminating any undesired dripping from the nozzle when the pump is not being actuated.

Briefly, the invention contemplates a dispenser for liquids comprising a supporting chassis, a supply tank for the liquid with the supply tank mounted on the chassis, a pump mounted on the chassis and communicating with the supply tank for pumping the liquid out of the dispenser and a nozzle mounted on the chassis and communicating with the pump for conveying the liquid out of the dispenser. The nozzle includes a housing member having an internal passage extending therethrough, an insert mounted within the housing member passage and a compressively elastically deformable sleeve interposed between the housing member and the insert. The insert has a passage extending from an opening in one end thereof to an opening in at least one side thereof, the end opening communicating with the pump. The portion of the sleeve adjacent the insert encases the portion of the insert having the side opening to normally seal such side opening and thus prevent the liquid from leaking out of the nozzle. The portion of the sleeve adjacent the housing member is retained against radially outward deflection by the housing member. Upon operation of the pump, the pressure of the liquid compressively elastically deforms the portion of the sleeve adjacent the insert so that the sleeve is forced away from the insert side opening, thus permitting the liquid to flow into and through the insert passage, out of the insert side opening, past the sleeve and out of the housing member passage at the outer end of the nozzle.

BRIEF DESCRIPTION OF THE DRAWINGS

The invention having been generally described, specific embodiments will be discussed in detail with reference to the accompanying drawings in which:

FIG. 6 is an exploded isometric view of part of the apparatus of FIG. 2;

FIG. 7 is a sectional view of the apparatus taken along the line 7—7 of FIG. 2 and shown at a slightly larger scale;

FIG. 8 is a sectional view taken along line 8—8 of FIG. 7;

FIG. 9 is a sectional view taken along line 9—9 of FIG. 8;

DESCRIPTION OF THE ILLUSTRATIVE EMBODIMENTS

Figure 1:
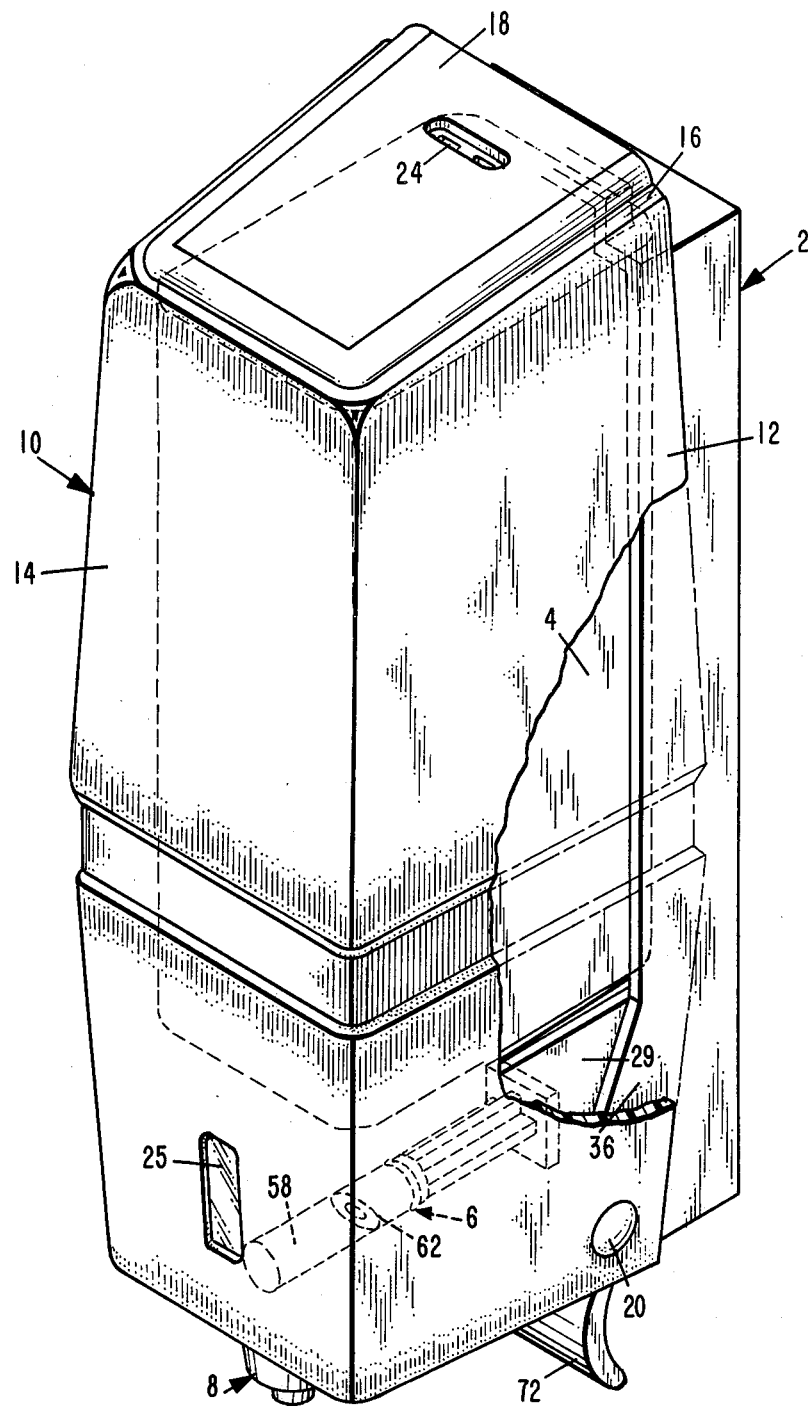
FIG. 1 is a front perspective view of the dispenser of this invention, with a portion of the cover broken away to disclose internal structure.

The apparatus of this invention is generally illustrated in FIG. 1 with the bulk of the operative mechanism shown in more detail in the sections of FIGS. 2, 4, 7 and 8. FIG. 1 generally illustrates the primary portions of this invention, including the supporting chassis generally indicated by reference numeral 2, the supply tank or bottle 4, a pump generally indicated by the numeral 6, and a nozzle indicated by reference numeral 8.

Figure 3:
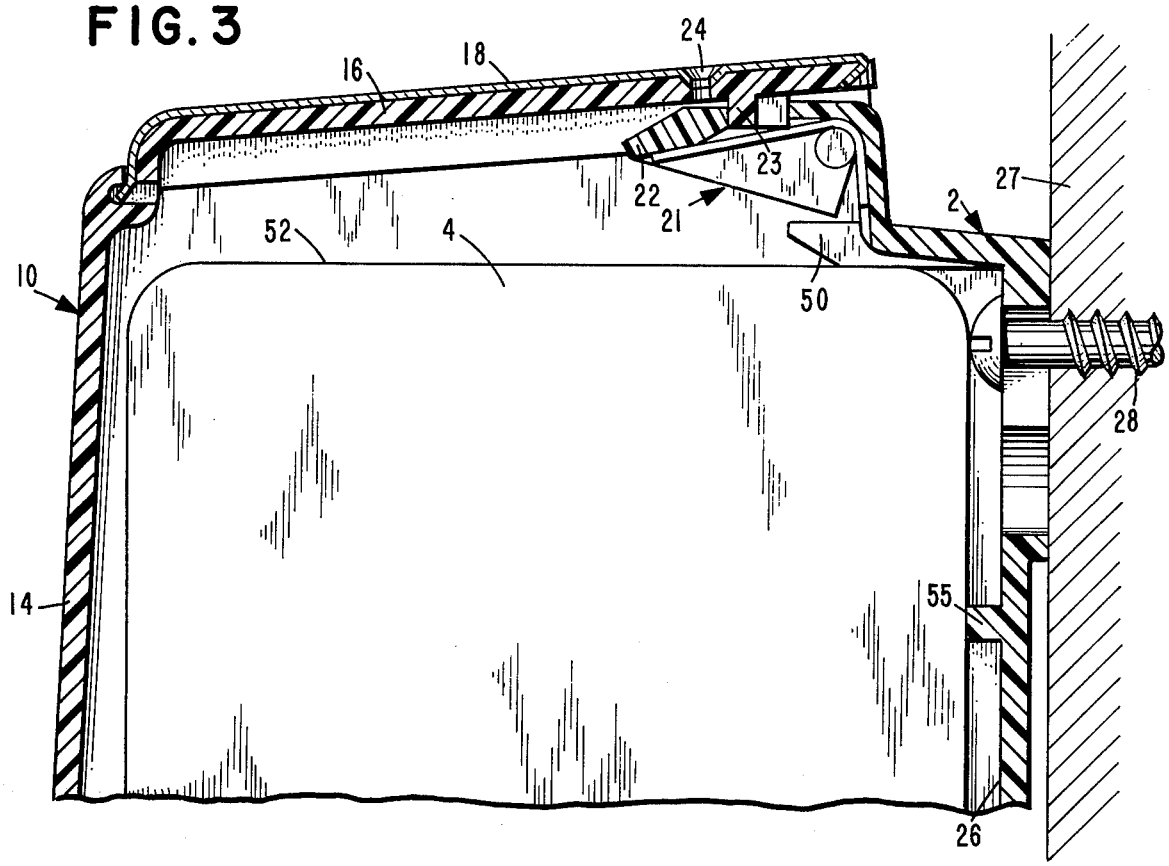
FIG. 3 is a vertical sectional view of the upper portion of the dispenser of FIG. 1.
Figure 5:
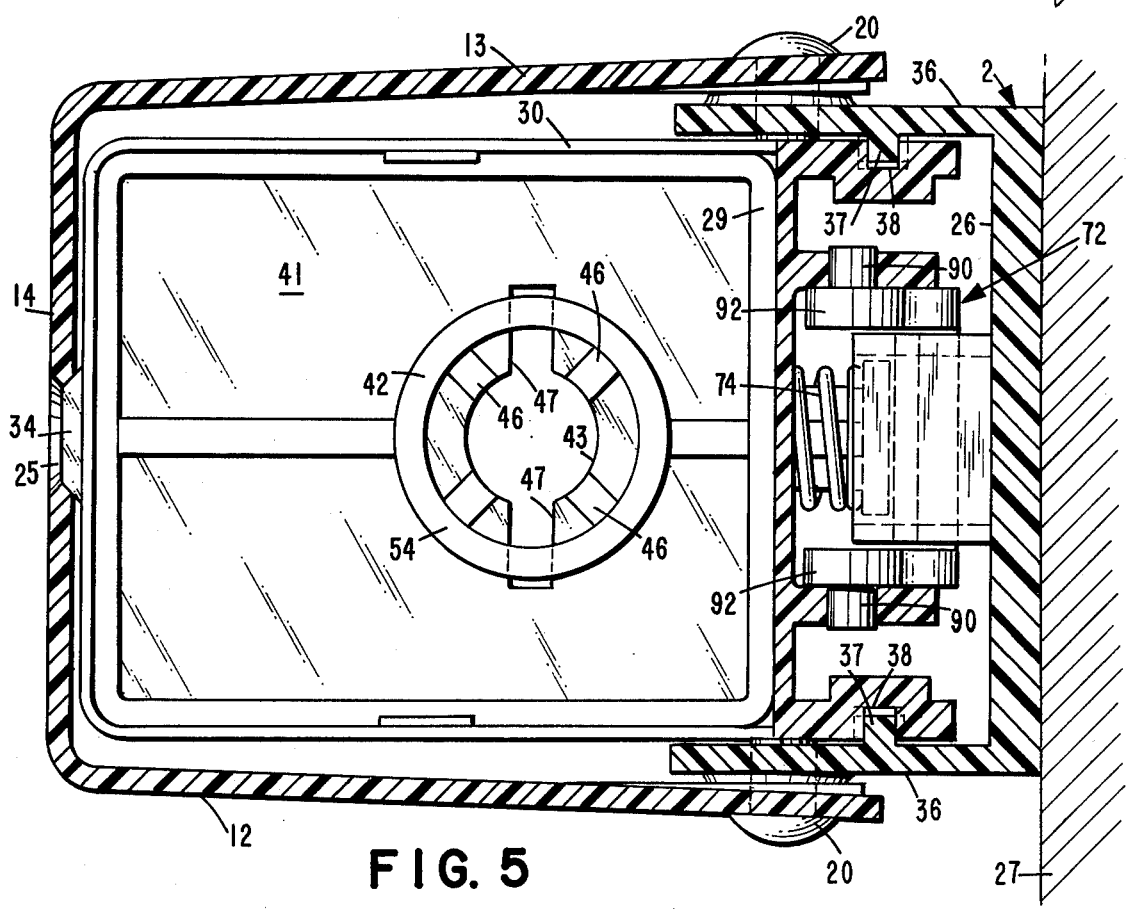
FIG. 5 is a horizontal sectional view taken along line 5—5 of FIG. 2.

As indicated in FIGS. 1, 3 and 5, the dispenser may be provided with a hinged cover 10 generally comprising a pair of side panels 12 and 13, a front panel 14 and a top panel 16. The material for this cover may conveniently be a suitable, substantially rigid synthetic resin of the general nature known in the trade as ABS, and the top panel may, if desired, be provided with a metal cap 18 overlying the synthetic resin to provide additional protection to the top panel 16. This cover may conveniently be attached to the supporting chassis by means of pivotal connections 20 and may be provided with any suitable latching mechanism 21 to hold the cover 10 in a closed position. Such latching mechanism may conveniently take the form of a spring-loaded catch 22 engaging a projection 23 on the inside of cover 10. Such latch may be released by inserting a properly configured key through opening 24 to depress catch 22 and thus release its engagement with projection 23, so that the cover may then be pivoted forwardly about pivotal connections 20 to open the dispenser. Such an arrangement would provide for automatic re-latching upon closing the cover. The front panel 14 of cover 10 may be provided with a liquid level viewing port 25 through which the amount of liquid remaining in the dispenser may be observed, in cooperation with additional structure to be described below.

In the dispenser of this invention, the supporting chassis 2 includes a back panel 26, which may conveniently be attached to a supporting wall 27 by threaded fasteners 28 on other suitable means, and the supporting component 29 housing the reservoir 30, the pump 6 and nozzle 8. This supporting component 29 may preferably be made from a generally transparent material, e.g., a suitable, substantially rigid synthetic resin, such that the level of the liquid 32 within such reservoir 30 may be visually observed through the front panel 34 of such reservoir. When the cover 10 is in its closed position, the viewing port 25 of such cover is generally aligned with the reservoir front panel 34 to permit observation of the level of liquid 32 from outside the dispenser.

Figure 2:
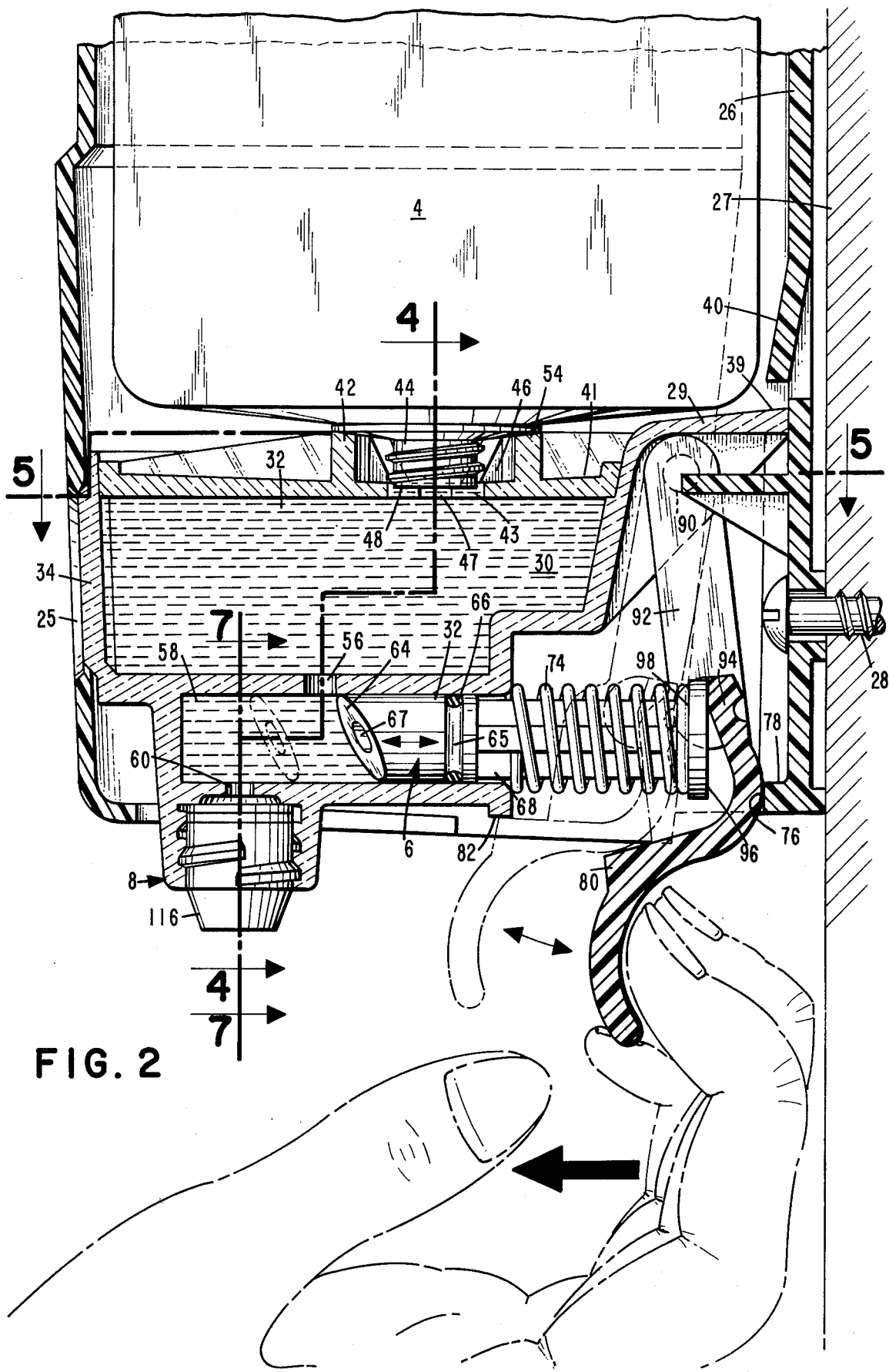
FIG. 2 is a vertical sectional view of the dispenser of FIG. 1 taken through the center of the lower portion thereof.

Structural component 29 may conveniently be attached to back panel 26 by tongue and groove construction as indicated in FIG. 5. Back panel 26, which may conveniently be formed from a tough and substantially rigid synthetic resin, may also have outwardly extending portions 36 formed integrally therewith to provide a generally U-shaped cross section, as shown in FIG. 5, with back panel 26 forming the base of the U and being fastened against the wall or other mounting structure and the outwardly extending portions 36 forming the legs of the U projecting outwardly therefrom to receive structural component 29 and also pivotal connections 20 attaching the cover 10 to the back panel 26. The outwardly extending portions 36 of the back panel 26 may be provided with opposing inwardly directed ribs 37 to support structural component 29. Structural component 29 is similarly provided with a pair of outwardly facing grooves 38 to receive ribs 37. Ribs 37 may conveniently be tapered in a predetermined manner with the large portion of the rib toward the bottom such that structural component 29 may be attached to back panel 26 by inserting component 29 from above and sliding it down the ribs 37 to the point where the above-described taper provides an interference fit with the slot 38, thus wedging structural component 29 in place. The rearwardmost projections 39 of structural component 29 may also be dimensioned to rest against the front portion of back panel 26, as shown in FIG. 2, to provide additional rigidity to the structure. Back panel 26 may also be provided with a resilient, inwardly projecting tab 40 (FIG. 2) such that, when structural component 29 is slid down ribs 37 into its wedged position, portion 39 of structural component 29 will snap past resilient tap 40, thus preventing unintended substantial movement of structural component 29 upwardly of its wedged position.

Figure 4:
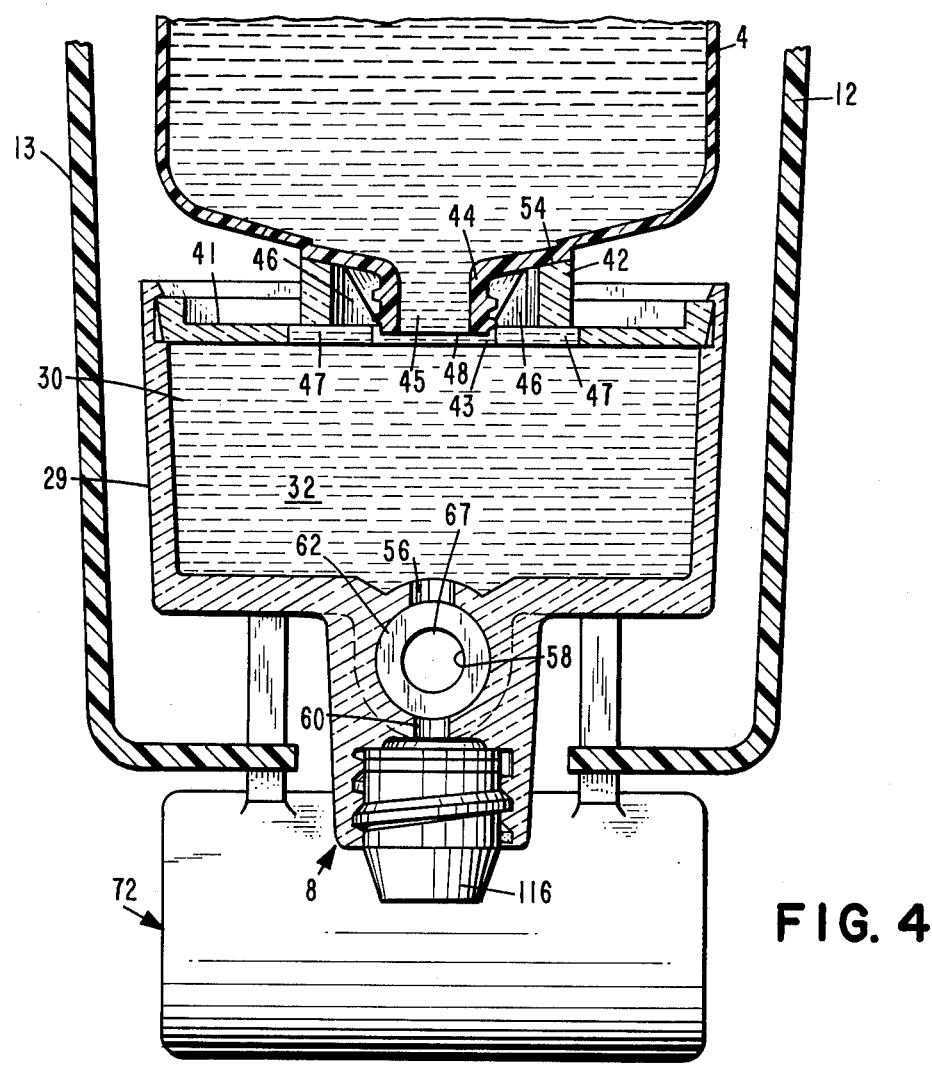
FIG. 4 is a sectional view of the apparatus taken along line 4—4 of FIG. 2.

Mating with the supporting component 29 is also a panel 41 which forms the top of reservoir 30. This panel 41 is provided with structure for supporting bottle 4 above and in communication with such reservoir 30. This bottle supporting structure includes collar 42 which engages the bottle as shown in FIGS. 2 and 4 to provide vertical support therefor. Additionally, within collar 42, which may desirably comprise a circular ring, is located the reservoir inlet opening 43 through which the liquid to be dispensed may flow into the reservoir 30. The supply tank or bottle 4, which may conveniently be a single use, replaceable item, is provided with a neck 44 which may conveniently be closed by a threaded cap or other means during shipment. The exit orifice 45 of the bottle neck 44 is of a relatively small diameter correlated to the viscosity of the liquid contained within such that, when the bottle 4 is inverted for loading into the dispenser, as shown in FIGS. 1, 2 and 4, none of the liquid contained therein will drip from the inverted bottle 4 for a period of time sufficient to facilitate insertion into the dispenser, generally at least three seconds. The length of bottle neck 44 is also predetermined with respect to bottle 4 configuration and bottle supporting collar 42 such that, when the bottle 4 is inserted into the dispenser, the outermost extremity 48 of the bottle neck 44 will project partially into the reservoir inlet opening 43, as indicated in FIGS. 2 and 4, for purposes to be described below. Panel 41 and collar 42 are also provided with a plurality of guide ribs 46 which extend from the uppermost inner surface of the collar 42 downwardly and inwardly to reservoir inlet opening 43 thus to provide guides for directing the neck 44 of the bottle 4 into the insert opening 43. As indicated in FIGS. 2, 4 and 5, the reservoir top panel 41 is also provided with vent slots 47 communicating with the reservoir inlet opening 43 and thus with the bottle neck 44 to permit air to enter the bottle at any time the level of liquid 32 falls below the outermost extremity 48 of the bottle neck 44. Thus, by known hydrodynamic and hydrostatic principles, liquid may flow from the bottle 4 until the level of liquid 32 is again raised to the level of the outermost extremity 48 of bottle neck 44.

As illustrated in FIGS. 2 and 3, the supply bottle 4 is retained in position within the dispenser by the interference fit relationship between the bottle 4, retaining member 50 of the supporting chassis back panel 26 and the collar 42 engaging the end of the bottle adjacent the bottle neck 44. Conveniently, the bottle 4 may be formed of a generally rigid but elastically deformable material, such as a synthetic resin, e.g., high density polyethylene. The vertical distance between the lowermost portion of retaining ledge 50 and the uppermost portion of collar 42 is slightly less than the distance, measured normal to the end 52 of the bottle 4, between the end 52 and the collar contacting portion 54. Thus, the insertion of the neck 44 of the bottle 4 into the collar 42 and then insertion of the opposite end portion 52 under the retaining ledge 50 will serve to deform the bottle 4 slightly dueto the interference fit, thus frictionally retaining the bottle 4 within the dispenser. Additionally, supporting chassis back panel 26 may conveniently be provided with bottle positioning projections 55 against which the bottle 4 may be inserted.

When the bottle 4 has thus been inserted into the dispenser, the liquid contained in such bottle may then flow into reservoir 30 until the level of liquid therein reaches the level of the outermost extremity 48 of the bottle neck 44, as described above.

The reservoir 30, communicating with the supply tank or bottle 4 through reservoir inlet 43 also communicates at the bottom thereof with dispensing pump 6 through orifice 56 which serves as the pump inlet port admitting liquid from the reservoir 30 into the cylinder 58 of the pump 6.

Pump 6 generally includes the circular cylinder 58, which has axially offset inlet and outlet ports 56 and 60, respectively, and a piston 62 which is mounted to reciprocate within such cylinder 58 between a first position, generally indicated by the solid lines in FIG. 2, and a second position, generally indicated in phantom in FIG. 2. In the first position the liquid contacting face 64 of the piston is adjacent the inlet port 56, and in the second position the liquid contacting face 64 of the piston 62 is generally adjacent outlet port 60 with piston 62 covering and closing inlet port 56. Piston 62 is further provided with a groove 65 and o-ring 66 cooperating with the cylinder 58 to prevent seepage of the pumped liquid past the cylinder contacting portions of piston 62. Cavity 67, communicating with liquid contacting face 64 is provided for manufacturing convenience and is not related to the operation of the dispenser of this invention.

The mechanism for actuating pump 6 is shown in the exploded view of FIG. 6 and includes generally piston 62, piston extension 68, piston indexing head 70, actuating handle 72 and compressive biasing spring 74.

Actuating handle 72, which may conveniently be formed of a substantially rigid synthetic resin and which serves selectively to impart reciprocating movement to piston 62 and thus to actuate the piston 62 for dispensing the liquid, is pivotally attached to supporting component 29 by means of a pair of outwardly extending pivot pins 90 which are received into corresponding pivot journals in supporting component 29, as shown in FIG. 5. Such pivot pins 90 are located adjacent the upper end of elongated pivot attachments 92 formed in the handle 72.

Actuating handle 72 also includes piston indexing head receiving member 94 which engages the axially outermost surface 96 of piston indexing head 70, thus to urge piston 62 inwardly of pump cylinder 58 upon pivotal actuation of the handle 72, as shown by the solid line and phantom illustations in FIG. 2. Compressive biasing spring 74, at one end thereof, engages the axially inward face 98 of indexing head 70, and at the opposite end thereof engages the portion of structural supporting component 29 surrounding the open end of pump cylinder 58. Thus, the action of compressive biasing spring 74 serves to urge piston 62 toward its first position, shown in the solid line representation of FIG. 2, while the operation of actuating handle 72 may serve selectively to overcome the action of spring 74 and thus momentarily move piston 62 toward its second position, shown in phantom in FIG. 2. The maximum extent of pivotal movement of actuating handle 72 is limited to the rear by the abutment of rearwardmost portion 76 of actuating handle 72 with projection 78 extending forwardly from back panel 26. Forward pivotal movement of actuating handle 72, and thus the maximum stroke of piston 62, is limited by the abutment of handle projection 80 with the downwardly projecting portion 82 of supporting component 29 adjacent the open end of pump cylinder 58 as indicated in FIG. 2.

Since different applications of a dispenser such as disclosed herein frequently render desirable the ability to dispense different predetermined amounts of the liquid upon a complete actuation of the apparatus, the pump structure of this dispenser is provided with means for adjusting the maximum output of the dispenser to any one of a preselected number of different volumes. In the illustrative embodiment the capability is provided for dispensing any one of four different volumes of liquid upon a complete actuation of the handle 72, although obvious modifications could easily provide for any other desired number of maximum output volumes. This adjustment of output volume is accomplished by selectively adjusting the maximum effectie stroke length of the piston, as described below.

Figure 13:
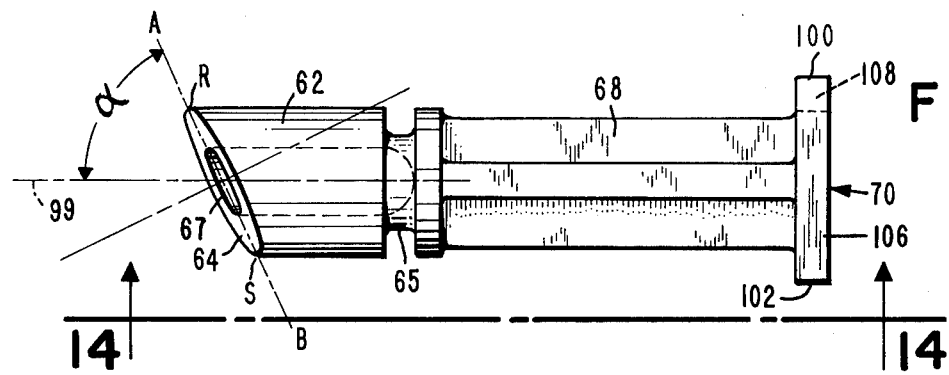
FIG. 13 is a side view of the pump piston of FIG. 6.
Figure 14:
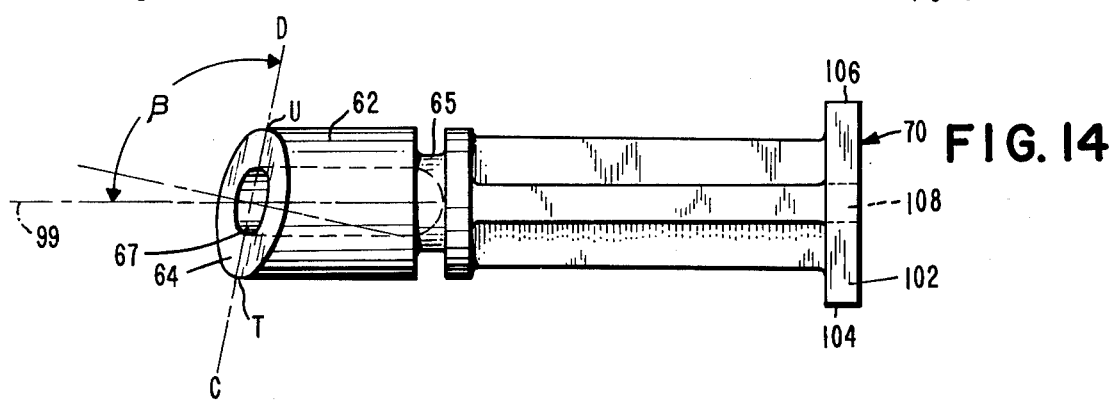
FIG. 14 is a bottom view of the pump piston of FIG. 6.
Figure 15:
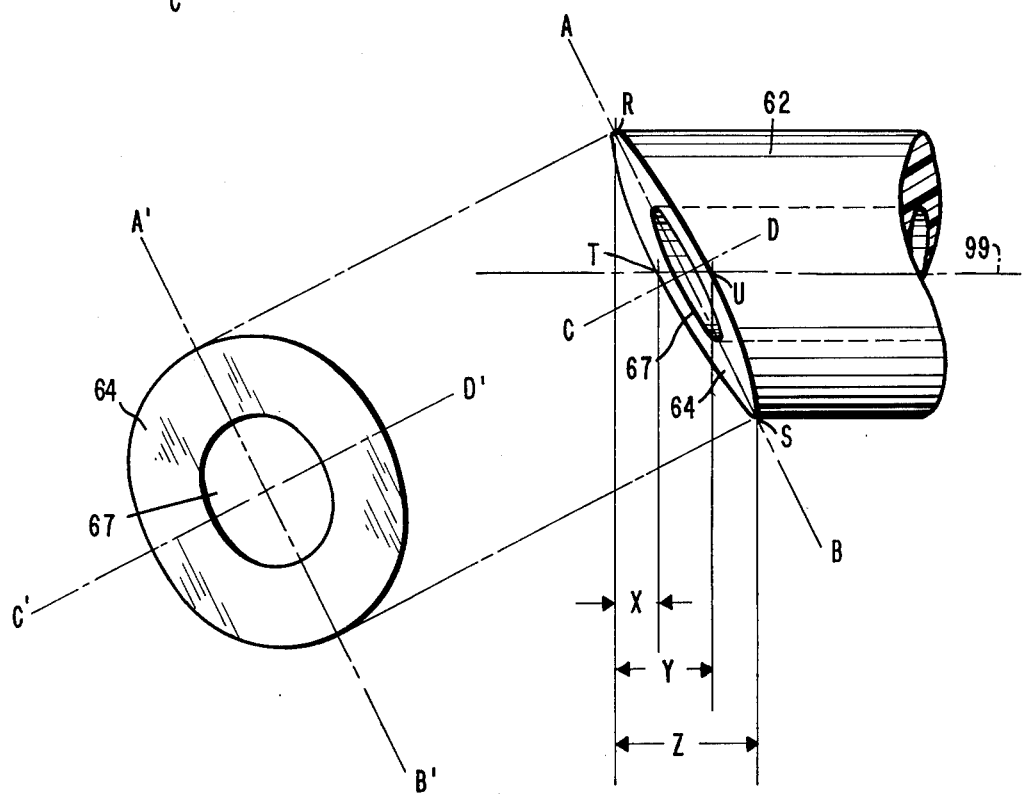
FIG. 15 is a diagrammatic view of the end of the pump piston of FIG. 13 with an auxiliary view illustrating the generally elliptical liquid contacting face thereof taken normal to such liquid contacting face.

The maximum effective stroke length adjustment derives from the liquid contacting face 64 of the piston 62 in this illustrative embodiment being angled with respect to the piston central axis 99, thus resulting in such liquid contacting face 64 being generally elliptical when viewed normal to such face. The angled relationship of this face to the piston axis is shown more clearly in the side view and bottom view of the piston to FIGS. 13 and 14, respectively. The elliptical nature of this face is illustrated in the auxiliary view of FIG. 15, which represents the projection of the piston face 64 in a direction normal to such face. In FIGS. 13, 14 and 15 the major elliptical axis is indicated by the line AB, and the minor elliptical axis is denoted by the line CD. The projections of such elliptical axes are denoted on the auxiliary view of FIG. 15 by the lines A'B' and C'D', respectively. As indicated in the side views of the piston in FIG. 13, the major elliptical axis, AB, forms a non-perpendicular angle $\alpha$ with respect to the piston central axis 99. Similarly, as is more clearly illustrated in FIG. 14, the minor elliptical axis CD also forms a non-perpendicular angle $\beta$ with respect to piston central axis 99.

In FIG. 15, the points R and S are defined by the intersection of major elliptical axis AB with the outermost edges of piston liquid contacting face 64. Such points R and S on the outermost portion of piston liquid contacting face 64 are aligned respectively with flats 100 and 102 of piston indexing head 70, which, for this embodiment, is a square boss. This alignment is such that planes tangential to the cylindrical outer surface of piston 62 at respective points R and S are parallel to respective flats 100 and 102. Points T and U, indicated in FIGS. 14 and 15, are defined by the respective points of tangency of the outermost portion of piston liquid contacting face 64, and thus the cylindrical outer surface of piston 62, with planes respectively parallel to piston indexing head flats 104 and 106, such points T and U thus being in orthogonal relationship with points R and S, with respect to piston cental axis 99.

In this preferred embodiment angles $\alpha$ and $\beta$ between the piston central axis 99 and elliptical major and minor axes AB and CD, respectively, are selected to provide the relationships illustrated in FIG. 15. These angular relationships result in the distances, taken longitudinally of piston central axis 99, between respective points R and T, R and U and R and S being generally in the relationship shown in FIG. 15, such distances conveniently indicated by the reference designators $x$, $y$ and $z$, respectively. Preferably, for this embodiment, the angles $\alpha$ and $\beta$ are selected to render the distance $y$ equal to twice that of $x$ and the distance $z$ equal to three times that of $x$.

The angled and generally elliptical piston liquid contacting face 64 and the distance relationships $x$, $y$ and $z$ are the means which serve to adjust the maximum effective stroke length of the piston, as follows. When the piston is at rest in its first position, as indicated by the solid line representation of FIG. 2, the liquid contacting face 64 of the piston exposes a portion of pump inlet port 56, thereby permitting liquid 32 from the reservoir 30 to flow into and thus fill the portion of cylinder 58 ahead of piston 62. When the dispenser handle 72 is actuated, thus urging piston 62 from its first position toward its second position (shown in phantom in FIG. 2), the liquid contained in cylinder 58 is thereby compressed by the piston advance. During the initial part of the stroke, while a portion of pump inlet port 56 remains open and uncovered by the advance of piston 62, the compressed liquid may flow in a reverse direction from cylinder 58, through inlet port 56 and back into reservoir 30, thus causing no substantial amount of liquid to be forced out of the pump outlet port 60 during this portion of the piston advance. Consequently, as long as a portion of inlet port 56 is open and not covered by the advance of piston 62, no substantial amount of liquid will be dispensed. Effectively, the dispensing result is the same as if the stroke length of the reciprocating piston 62 were reduced by an amount equal to the portion of the stroke wherein inlet port 56 remains open. At the point in the piston advance where the liquid contacting face 64 of the piston 62 has moved past inlet port 56, thus completely closing such inlet port, no path for any such reverse flow of liquid is then open. Accordingly, from this point of the piston advance onward, the only outlet for the compressed liquid is through pump outlet 60 and nozzle 8, and further advance of the piston 62 will thus result in liquid being so dispensed. FIG. 2 illustrates the alignment with inlet port 56 of the portion of piston 62 and piston liquid contacting face 64 immediately adjacent point R on the outermost portion of such liquid contacting face 64. By selectively indexing the piston to the other three positions of rotation, each 90° apart, the portions of the piston liquid contacting face 64 immediately adjacent points S, T and U on the outermost portion of piston face 64 may be aligned with such inlet port and thus spaced from such inlet port in the direction of the pump cylinder aixs, parallel to piston central axis 99. In the position of piston rotation shown in FIG. 2, where point R is generally aligned with inlet port 56, such reverse flow would be cut off at the earliest point in the piston stroke, thus resulting in the minimum possible reverse flow and the dispensing of the maximum possible amount by actuation of the dispenser pump 6. By aligning points T, U and S respectively, with the inlet port 56, reverse flow of the liquid from cylinder 58 back into the reservoir 30 may occur during respective incrementally greater portions of the piston advance, thus resulting in respective incrementally smaller maximum amounts of liquid being pumped out of outlet port 60, and thus dispensed by actuation of the pump. To assist in adjusting the output of pump 6, piston indexing head flat 100 is provided with an indexing notch 108 to indicate the rotational alignment of the piston 62, and thus the predetermined maximum pump output setting thereof.

As is most clearly shown in FIG. 6, the piston indexing head receiving member 94 of actuating handle 72 is provided with a pair of indexing tabs 112 projecting outwardly from piston indexing head receiving member 94. These indexing tabs 112 are spaced to embrace opposing pairs of the flats 100, 102, 104 and 106 of piston indexing head 70 and thus prevent rotation thereof. Accordingly, the dispenser of this invention may be set for any of the predetermined maximum output volumes by selectively engaging indexing head 70 with indexing tabs 112 in any of the desired rotational orientations. Resetting the piston 62 for a different maximum effective stroke length and thus different maximum output volume may be accomplished by retaining the actuating handle 72 at its rearwardmost position while moving piston indexing head 70 axially out of engagement with indexing tabs 112, against the action of spring 74, and then rotating the indexing head to any other desired position before re-engaging it with indexing tabs 112. Indexing slot 108 is provided head flat 100 to indicate to the person so adjusting the dispenser the orientation of the piston 62 within the pump 6. The dispenser cover 10 associated with this dispenser may conveniently be arranged to permit such adjustment of the maximum effective stroke length and thus dispensing volume only at such time as the dispenser has been properly opened for servicing, thus preventing unauthorized tampering.

From the dispensing pump 6, the dispensed liquid flows through pump outlet port 60 into the nozzle assembly 8, two embodiments of which are illustrated in more detail in FIGS. 7-11. In the embodiment of FIGS. 7, 8 and 9, the nozzle assembly 8 is shown retained in the dispenser by the threaded insertion of cylindrical nozzle housing member 116 into the portion of structural component 29 adjacent pump outlet port 60. This nozzle housing member 116 is provided with a centrally disposed axial passage extending therethrough. At the upper end of nozzle housing member 116 and extending partially along such axial passage is an insert 118 (FIG. 10) having a flange 120 which abuts, on one side, the upper end of nozzle housing member 116 and, on the other side, sealing washer 122. By the threaded insertion of nozzle housing member 116 into the supporting component 29, the sealing washer 122 may be compressed against its seal in supporting component 29 by the action of nozzle housing member 116 against flange 120 of insert 118, thus providing a liquid-tight seal around the periphery of such sealing washer 122.

Figure 10:
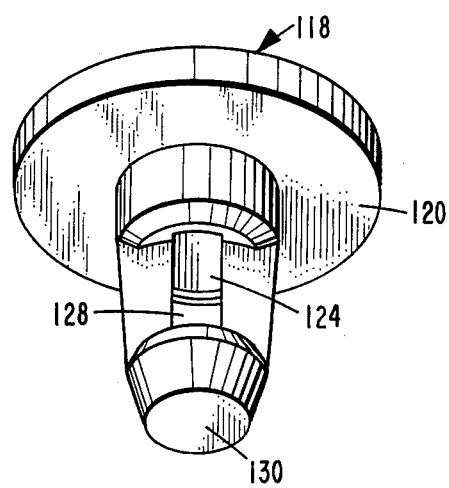
FIG. 10 is a perspective view of the nozzle insert included in the apparatus of FIGS. 7 and 8.

Insert 118, shown in more detail in FIG. 10, is provided with a centrally located passage 124 extending from an opening 126 in the upper end of insert 118, partially along the length of insert 118 to at least one side opening 128 in insert 118. In this embodiment preferably two side openings 128 are provided by removing part of the otherwise generally cylindrical structure of insert 118 adjacent a portion of the passage 124. The portion of the insert 118 extending from the underside of flange 120 to the lowermost portion 130 of the insert, or preferably slightly below, is encased by a compressively elastically deformable sleeve 132, which may conveniently be formed of a resilient cellular synthetic resin having a closed cell structure. The radial dimensions and configuration of this sleeve 132 are such that it provides an interference fit with the insert 118, being stretched over such insert 118 and compressively elastically encasing the same, and thus normally closing side passages 128 of the insert 118. The external lateral dimensions of sleeve 132, which sleeve conveniently may be cylindrical, are slightly larger than the transverse internal dimensions of nozzle housing cavity 124, within which the sleeve is retained. This dimensional relationship provides for a compressive load upon the compressively elastically deformable sleeve 132 when such sleeve and its associated insert 118 are inserted into the nozzle housing cavity 134. Thus, the compressive elastic fit of the compressively elastically deformable sleeve 132 over insert 118 serves to seal the side passages 128 of the insert 118 and thus prevent leakage of liquid which may flow through pump outlet port 60, the central hole of sealing washer 122 insert opening 126, insert passage 124 and insert side openings 128. Accordingly, the compressively elastically deformable insert 132 prevents undesired dripping of such liquid from the nozzle outlet 136.

The manner of operation of this nozzle assembly 8 is illustrated in FIGS. 7 and 8. Under normal conditions, when the dispensing pump is not actuated and no liquid is desired to be dispensed, the compressively elastically deformable sleeve 132 functions to close the side passages 128 of the insert 118, thus preventing unintended leakage and dripping of liquid from the dispenser. However, when the pump 6 is actuated by actuating handle 72 to dispense liquid, the pressure from the compressed liquid acts through pump outlet port 60, along nozzle insert passage 124 and insert side openings 128 and against compressively elastically deformable sleeve 132. This liquid pressure serves to compress such compressively elastically deformable sleeve 132 and deform the inner surface thereof away from side openings 128, as indicated in phantom in FIGS. 7 and 8. Thus, this compressive deformation of the sleeve 132 provides an open passage for the liquid from the side openings 128, past the deformed sleeve 132 and out the nozzle outlet 136 to the user. By virtue of the interference fit between sleeve 132 and nozzle housing cavity 134, such sleeve may be deformed only compressively and not by radial deflection. Upon termination of the pump dispensing stroke, such pressure from the liquid is released and the elastic nature of compressively elastically deformable sleeve 132 may again serve to close and lightly seal the side openings 128 of insert 118, thus preventing any continued dripping of the liquid.

Conveniently, nozzle assembly 8 may be threadedly inserted into dispenser structural member 29 by means of a hexagonal key fitting into a mating hexagonal socket 138 formed within the outlet 136 of nozzle housing member 116, thus effectively precluding the removal of such nozzle assembly without the proper tools and thus reducing the likelihood of vandalism thereof.

Figure 11:
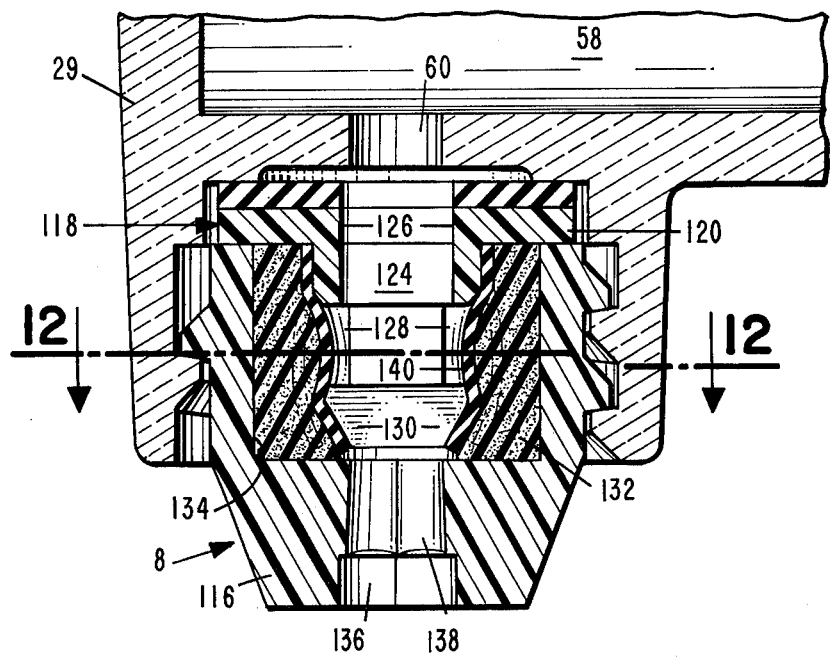
FIG. 11 is a sectional view of another embodiment of the apparatus of FIG. 8.
Figure 12:
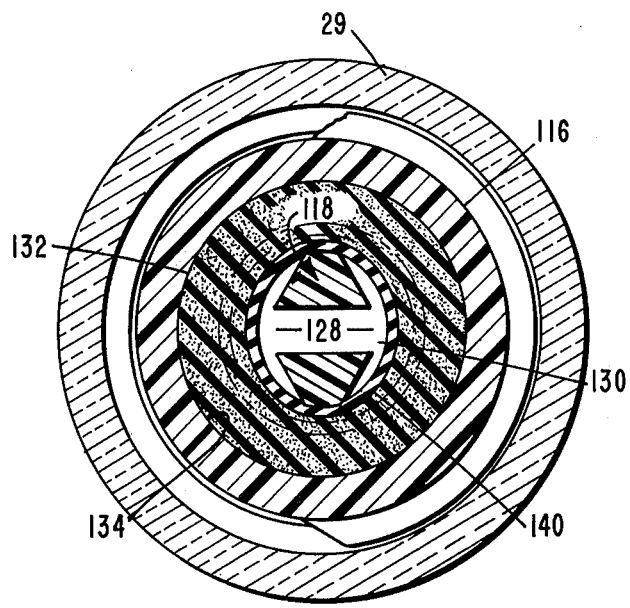
FIG. 12 is a sectional view taken along line 12—12 of FIG. 11.

FIGS. 11 and 12 illustrate another embodiment of nozzle assembly 8 having substantially identical components to that structure of FIGS. 7, 8 and 10 but including an additional tubular sealing member 140 interposed between the insert 118 and the compressively elastically deformable sleeve 132. This sealing member 140 may conveniently be formed of a flexible, resilient synthetic resin such that the action of the pumped liquid, described above, may cause radial deformation of the elastic tubular sealing member 140 conjunctively with the compressive elastic deformation of sleeve 132. By use of this additional tubular sealing member 140, a tighter and longer lasting seal may be effected against the side opening 128 of insert 118.

An additional advantage of the dispenser of this invention is illustrated in FIG. 2. By virtue of the relationship of the downwardly projecting actuating handle 72 and the downwardly projecting nozzle assembly 8, wherein the actuating handle is positioned adjacent the back panel 26 of the dispenser, and thus adjacent the supporting wall or structure 27 to which the dispenser is attached, the normal mode of operation will be that shown in FIG. 2. A user normally will place his fingertips around the wide, downwardly projecting actuating handle 72 and pull it toward him, as indicated by the arrow in FIG. 2. By grasping such handle by his fingertips, the palm of the user will be in an upwardly facing orientation and will be positioned generally below the nozzle outlet 136. Thus, actuation of the handle 72 will cause the liquid, which may conveniently be a liquid soap, to be dispensed into the upwardly facing palm of the user's hand, thus both facilitating single hand operation of the dispenser and reducing spillage which might occur if the hand were not so placed. By virtue of the nozzle assembly 8, described above, the outlet of the dispenser is normally maintained in a closed and lightly sealed condition, such that the liquid will not drip therefrom, thus promoting cleanliness of the location in which the dispenser is installed.

The foregoing is considered as illustrative only of the principles of the invention. While the dispensing of soap has been described as one useful function thereof, clearly the dispenser is suitable for use with numerous other liquids. Further, since numerous modifications and changes, such as the provision of a greater or smaller number of piston maximum effective stroke lengths and insert side openings, will readily occur to those skilled in the art, it is not desired to limit the invention to the exact construction and operation shown and described. Accordingly, all suitable modifications and equivalents falling within the scope of the invention may be included.

What is claimed is:

1. A dispenser for liquids comprising:
a supporting chassis;
a supply tank mounted on said chassis for storing a quantity of a liquid;
a pump mounted on said chassis and communicating with said supply tank for pumping the liquid out of the dispenser; and
a nozzle mounted on said chassis and communicating with said pump for conveying the liquid out of the dispenser, said nozzle including a housing member having an internal passage extending therethrough, an insert mounted within said housing member passage, said insert having a pair of generally opposed ends and sides extending between said ends, said insert further having a passage extending from an opening in one of said ends thereof to an opening through at least one of said sides thereof, said insert end opening communicating with said pump, and a compressively elastically deformable sleeve interposed between said housing member and said insert, said sleeve being compressed radially against said insert sides including the portion of said one side having said insert side opening therethrough by generally radially inward forces exerted by said housing member upon said sleeve, the portion of said sleeve adjacent said housing member being retained against radially outward deflection by said housing member, the portion of said sleeve adjacent said insert encasing the portion of said insert having said insert side opening therethrough to normally seal said insert side opening and thereby prevent the liquid from leaking out of the nozzle, whereby when the pump is actuated, the liquid compressively elastically deforms the portion of said sleeve adjacent said insert so that the sleeve is forced away from said insert side opening and the liquid flows into said insert passage through said insert end opening, through said insert passage, out of said insert passage through said insert side opening, past said sleeve and out of said housing member passage.

2. A dispenser for liquid according to claim 1 wherein said supply tank comprises a replaceable container.

3. A dispenser for liquids according to claim 2 wherein said supporting chassis includes means for retaining said replaceable container within said dispenser.

4. A dispenser for liquids according to claim 3 wherein said retaining means comprises a member providing an interference fit between said container and said supporting chassis, whereby said container may be wedged in place within said dispenser.

5. A dispenser for liquids according to claim 2 wherein said replaceable container includes an exit orifice having a diameter correlated to the viscosity of the liquid contained therein such that gravity-induced flow therethrough will not initiate for at least three seconds after said container orientation is changed from having said orifice facing generally vertically upwardly to generally vertically downwardly.

6. A dispenser for liquids according to claim 1 further comprising a reservoir intermediate said supply tank and said pump, said reservoir including an inlet opening, and said supply tank having an exit orifice in communication with said reservoir inlet opening.

7. A dispenser for liquids according to claim 6 wherein at least part of said reservoir comprises a generally transparent material whereby the liquid level in said reservoir may be visually observed.

8. A dispenser for liquids according to claim 6 wherein said reservoir includes a member adapted to support said supply tank with said exit orifice of said supply tank in communication with said intermediate reservoir.

9. A dispenser for liquids according to claim 8 wherein said supply tank comprises a bottle insertable into said dispenser with said exit orifice comprising the outer end of the neck of said bottle and wherein said supply tank supporting member comprises a panel generally covering the top of said reservoir.

10. A dispenser for liquids according to claim 9 wherein said reservoir top panel includes an upwardly projecting collar surrounding the inlet opening of said reservoir to engage and support said bottle and into which said bottle neck projects.

11. A dispenser for liquids according to claim 10 wherein the upward projection of said collar is a first length and said bottle neck is of a second length, said first length being less than said second length, such that said bottle neck projects only partially through said reservoir inlet opening, whereby, as long as said bottle is providing liquid to said reservoir, said reservoir will be maintained completely full of said liquid with a small amount of said liquid in said inlet opening up to the level of the outer end of said bottle neck so that air may be prevented from entering said reservoir.

12. A dispenser for liquids according to claim 11 wherein said reservoir top panel includes a vent slot communicating with said reservoir inlet opening and with said bottle neck projecting thereinto to admit air into said bottle in a predetermined manner to maintain a predetermined level of said liquid within said reservoir inlet opening.

13. A dispenser for liquids according to claim 10 wherein said collar includes a plurality of ribs projecting inwardly and downwardly to said reservoir inlet opening, whereby said ribs may serve to guide the outer end of the neck of the bottle neck into the reservoir inlet opening during the insertion of the bottle into the dispenser.

14. A dispenser for liquids according to claim 1 further comprising a cover for said dispenser, said cover having two side panels, a front panel and a top panel.

15. A dispenser for liquids according to claim 14 further comprising a protective cap overlying a substantial portion of said cover top panel.

16. A dispenser for liquids according to claim 1 wherein said pump includes an actuating handle projecting downwardly from said pump and positioned adjacent a portion of said dispenser supporting chassis adapted for mounting said dispenser to a wall, whereby said actuating handle will be toward the back of the dispenser with respect to a user thereof.

17. A dispenser for liquids according to claim 16 wherein said nozzle projects downwardly from said pump and is spaced from said actuating handle and remote from said supporting chassis mounting portion, said actuating handle and said nozzle being positioned such that the grasping of the lowermost portion of said actuating handle by the fingertips of a user with the palm of such hand of said user facing upwardly will tend to place the palm of said user's hand generally beneath said nozzle, whereby, actuation of said handle by that hand of said user will dispense said liquid from said nozzle into said upwardly facing palm of said hand.

18. A dispenser for liquids according to claim 1 wherein said pump comprises:
   a cylinder having axially offset inlet and outlet ports;
   a piston disposed within said cylinder, said piston having its central axis aligned with the cylinder axis and being mounted for reciprocating movement therealong between a first position and a second position, said piston having a liquid contacting portion positioned adjacent said inlet port when said piston is in said first position and generally adjacent said outlet port when said piston is in said second position, said piston also being adapted for rotation about said central axis to any one of a plurality of predetermined positions of rotation;
   means for selectively imparting reciprocating movement to said piston, whereby, when said piston is in said first position, liquid flows into said cylinder through said inlet port and, upon actuation of said movement imparting means, said piston is moved to said second position to thereby force a preselected volume of liquid out of said outlet port;
   means associated with said piston liquid contacting portion for selectively adjusting the maximum effective stroke length of said piston upon movement thereof from said first position to said second position, said maximum stroke length adjusting means comprising said piston liquid contacting portion being an angled and generally elliptical face on said piston, said angled and generally elliptical face being oriented such that both the major and minor elliptical axex thereof form non-perpendicular angles with said piston central axis, each said position of piston rotation providing, when said piston is in said first position, for a predetermined distance between said inlet port and the portion of said piston face spaced from said inlet port in the direction of said cylinder axis, whereby, in each said predetermined position of piston rotation, during a portion of the movement of said piston from said first position to said second position, the liquid may flow back out said inlet port until said piston covers said inlet port, each said predetermined position of piston rotation thereby corresponding to a predetermined maximum effective piston stroke length and thus to a preselected maximum volume of liquid to be forced out of the outlet port; and means operatively associated with said maximum effective stroke length adjusting means for selectively maintaining said piston in said one position of rotation.

19. A dispenser according to claim 18 wherein the portion of the piston cooperating with said selective reciprocating movement imparting means includes indexing means corresponding to said predetermined positions of piston rotation, whereby, selective indexing of said piston serves to provide, when said piston is in said first position, for different predetermined distances between said inlet port and the portion of said piston face spaced from said inlet port in the direction of said cylinder axis and thus for different maximum output volumes available from said pump.

20. A dispenser for liquids according to claim 19 wherein said selective reciprocating movement imparting means comprises:

an actuating handle for urging said piston from said first position to said second position, said handle including piston rotational position maintaining tabs for selectively engaging said piston indexing means; and spring biasing means cooperating with said piston to urge said piston from said second position to said first position.

21. A dispenser for liquids according to claim 20 wherein said piston indexing means comprises a square boss on the end of said piston remote from said liquid-contact face with the flats of said square boss being engaged by said piston rotational position maintaining tabs, whereby said piston may be maintained in any one of four positions of rotation.

22. A dispenser for liquids according to claim 1 wherein said nozzle housing member is removably attachable to said pump.

23. A dispenser for liquids according to claim 1 wherein said nozzle housing member 6 is of generally cylindrical configuration with said passage extending axially therethrough.

24. A dispenser for liquids according to claim 1 wherein said sleeve is formed of resilient cellular synthetic resin.

25. A dispenser for liquids according to claim 1 further comprising a radially elastically deformable tubular sealing member interposed between said insert and said compressively elastically deformable sleeve, whereby said sealing member may deform elastically radially conjunctively with the compressive elastic deformation of said sleeve under the pressure of the pumped liquid.

26. A nozzle for use with a pump for dispensing liquids comprising:

a housing member having an internal passage extending therethrough;

an insert mounted within said housing member passage, said insert having a pair of generally opposed ends and sides extending between said ends, said insert further having a passage extending from an opening in one of said ends thereof to an opening through at least one of said sides thereof, said insert end opening communicating with said pump; and a compressively elastically deformable sleeve interposed between said housing member and said insert, said sleeve being compressed radially against said insert sides including the portion of said one side having said insert side opening therethrough by generally radially inward forces exerted by said housing member upon said sleeve, the portion of said sleeve adjacent said housing member being retained against radially outward deflection by said housing member, the portion of said sleeve adjacent said insert encasing the portion of said insert having said insert side opening therethrough to normally seal said insert side opening and thereby prevent the liquid from leaking out of the nozzle, whereby when the pump is actuated, the liquid compressively elastically deforms the portion of said sleeve adjacent said insert so that the sleeve is forced away from said insert side opening and the liquid flows into said insert passage through said insert end opening, through said insert passage, out of said insert passage through said insert side opening, past said sleeve and out of said housing member passage.

27. The nozzle according to claim 26 wherein said nozzle housing member is removably attachable to said pump.

28. The nozzle according to claim 26 wherein said nozzle housing member is of generally cylindrical configuration with said passage extending axially therethrough.

29. The nozzle according to claim 26 wherein said sleeve is formed of resilient cellular synthetic resin.

30. The nozzle according to claim 26 further comprising a radially elastically tubular sealing member interposed between said insert and said compressively elastically deformable sleeve, whereby said sealing member may deform radially elastically conjunctively with the compressive elastic deformation of said sleeve under the pressure of the pumped liquid.

31. A pump for metering a preselected volume of liquid comprising:

a cylinder having axially offset inlet and outlet ports;

a piston disposed within said cylinder, said piston having its central axis aligned with the cylinder axis and being mounted for reciprocating movement therealong between a first position and a second position, said piston having a liquid contacting portion positioned adjacent said inlet port when said piston is in said first position and adjacent said outlet port when said piston is in said second position, said piston also being adapted for rotation about said central axis to any one of a plurality of predetermined positions of rotation;

means for selectively imparting reciprocating movement to said piston, whereby, when said piston is in said first position, liquid flows into said cylinder through said inlet port and, upon actuation of said movement imparting means, said piston is moved to said second position to thereby force a preselected volume of liquid out of said outlet port;

means associated with said piston liquid contacting portion for selectively adjusting the maximum effective stroke length of said piston upon movement thereof from said first position to said second position, said maximum stroke length adjusting means comprising said piston liquid contacting portion being an angled and generally elliptical face on said piston, said angled and generally elliptical face being oriented such that both the major and minor elliptical axes thereof form non-perpendicular angles with said piston central axis, each said position of piston rotation providing, when said piston is in said first position, for a predetermined distance between said inlet port and the portion of said piston face spaced from said inlet port in the direction of said cylinder axis, whereby, in each said predetermined position of piston rotation, during a portion of the movement of said piston from said first position to said second position, the liquid may flow back out said inlet port until said piston covers said inlet port, each said predetermined position of piston rotation thereby corresponding to a predetermined maximum effective piston stroke length and thus to a preselected maximum volume of liquid to be forced out of the outlet port; and means operatively associated with said maximum effective stroke length adjusting means for selectively maintaining said piston in said one position of rotation.

32. A pump according to claim 31 wherein the portion of the piston cooperating with said selective reciprocating movement imparting means includes indexing means corresponding to said predetermined positions of piston rotation, whereby, selective indexing of said piston serves to provide, when said piston is in said first position, for different predetermined distances between said inlet port and the portion of said piston face spaced from said inlet port in the direction of said cylinder axis and thus for different maximum output volumes available from said pump.

33. A pump according to claim 32 wherein said selective reciprocating movement imparting means comprises:

an actuating handle for urging said piston from said first position to said second position, said handle including piston rotational position maintaining tabs for selectively engaging said piston indexing means; and spring biasing means cooperating with said piston to urge said piston from said second position to said first position.

34. A pump according to claim 33 wherein said piston indexing means comprises a square boss on the end of said piston remote from said liquid-contacting face with the flats of said square boss being engaged by said piston rotational position maintaining tabs, whereby, said piston may be maintained in any one of four positions of rotation.

* * * * *